United States Patent
Pandit et al.

(10) Patent No.: US 11,592,195 B2
(45) Date of Patent: Feb. 28, 2023

(54) DEHUMIDIFYING AIR HANDLING UNIT AND DESICCANT WHEEL THEREFOR

(71) Applicant: TRANE INTERNATIONAL INC., Davidson, NC (US)

(72) Inventors: Yogesh Pandit, Bengaluru (IN); Ronnie R. Moffitt, Harrodsburg, KY (US); Zubin Varghese, Bangalore (IN); Jeyaprakash Gurusamy, Bangalore (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 99 days.

(21) Appl. No.: 17/175,036

(22) Filed: Feb. 12, 2021

(65) Prior Publication Data

US 2022/0260262 A1 Aug. 18, 2022

(51) Int. Cl.
 *B01D 53/06* (2006.01)
 *F24F 3/14* (2006.01)

(52) U.S. Cl.
 CPC ............ *F24F 3/1423* (2013.01); *B01D 53/06* (2013.01); *F24F 3/14* (2013.01); *F24F 3/1429* (2013.01); *B01D 2253/204* (2013.01); *B01D 2257/80* (2013.01); *B01D 2259/40086* (2013.01);
 (Continued)

(58) Field of Classification Search
 CPC .............. B01D 53/06; B01D 2253/204; B01D 2257/80; B01D 2259/40086; B01D 2259/4508; F24F 3/14; F24F 3/1429; F24F 3/1423; F24F 2003/144; F24F 2003/1458;
 (Continued)

(56) References Cited

U.S. PATENT DOCUMENTS 10,266,737 B2   4/2019  Van Horn et al.
10,948,202 B2 * 3/2021  Lee .................... F24F 3/153
 (Continued)

FOREIGN PATENT DOCUMENTS

CN    209484741 U   10/2019
CN    112303787 A    2/2021
 (Continued)

OTHER PUBLICATIONS

International Search Report and Written Opinion, International Patent Application No. PCT/IB/2022/051243, dated May 16, 2022 (12 pages).

*Primary Examiner* — Frank M Lawrence, Jr.
(74) *Attorney, Agent, or Firm* — Hamre, Schumann, Mueller & Larson, P.C.

(57) ABSTRACT

A dehumidifying air handling unit for an HVACR system includes a housing, a desiccant wheel, and a cooling heat exchanger. A main airflow path extending through the housing from an air inlet to and air discharged outlet of the housing. The desiccant wheel includes a first end and a second end that are each disposed in the main airflow path and a metal organic framework desiccant that is moved between the first end and the second end. A desiccant wheel includes a metal organic framework desiccant disposed on a surface of the desiccant wheel. Rotation of the desiccant wheel moves a position of the surface between a first end and a second end of the desiccant wheel. The metal organic framework desiccant has an majority absorption-desorption operating band of 25% relative humidity or less.

17 Claims, 4 Drawing Sheets

(52) U.S. Cl.
CPC ............... *B01D 2259/4508* (2013.01); *F24F 2003/144* (2013.01); *F24F 2003/1458* (2013.01)

(58) Field of Classification Search
CPC ....... F24F 2003/1464; F24F 2203/1032; F24F 2203/1036
USPC ......... 95/113, 117; 96/125, 126, 146; 34/80, 34/472, 473
See application file for complete search history.

(56) References Cited

U.S. PATENT DOCUMENTS

| | | | |
|---|---|---|---|
| 2005/0262862 A1* | 12/2005 | Moffitt | F24F 3/1423 62/93 |
| 2007/0163279 A1 | 7/2007 | Moffitt | |
| 2011/0011805 A1* | 1/2011 | Schubert | B01D 53/28 210/689 |
| 2014/0319058 A1* | 10/2014 | Taylor-Pashow | C02F 1/288 423/608 |
| 2016/0084541 A1 | 3/2016 | Aguado et al. | |
| 2019/0185705 A1 | 6/2019 | Wengeler et al. | |
| 2020/0139343 A1 | 5/2020 | Lee et al. | |
| 2022/0274053 A1* | 9/2022 | Kunapuli | B01D 53/28 |

FOREIGN PATENT DOCUMENTS

| | | |
|---|---|---|
| EP | 2998377 A1 | 3/2016 |
| KR | 10-20110031875 A | 3/2011 |
| WO | 2018/162614 A1 | 9/2018 |
| WO | 2018/220027 A1 | 12/2018 |
| WO | 2019/175717 A1 | 9/2019 |
| WO | WO 2019/175717 A * | 9/2019 |
| WO | 2019/231297 A1 | 12/2019 |
| WO | 2020-168171 A1 | 8/2020 |

* cited by examiner

DEHUMIDIFYING AIR HANDLING UNIT AND DESICCANT WHEEL THEREFOR

FIELD

This disclosure relates generally to a heating, ventilation, air conditioning, and refrigeration ("HVACR") systems. More specifically, this disclosure relates to a dehumidifier air handling unit ("AHU") used in HVACR systems.

BACKGROUND

HVACR systems are generally used to heat, cool, and/or ventilate an enclosed space (e.g., an interior space of a commercial building or a residential building, an interior space of a refrigerated transport unit, or the like). An AHU is part of a HVACR system that is used to regulate and circulate air. A ductwork ventilation system can be connected to the AHU and directs conditioned air from the AHU to the enclosed space and air from the conditioned space to the AHU. The AHU can include a housing, fan(s), and a heat exchanger(s). The AHU can be a dehumidifying AHU that includes a desiccant wheel for dehumidifying air.

BRIEF SUMMARY

A heating, ventilation, air conditioning, and refrigeration ("HVACR") system can be utilized to heat and/or cool a conditioned space. The HVACR system can utilize an air handling unit ("AHU") to regulate and circulate air. The air handling unit receives air (e.g., air from the conditioned space, ambient air, and the like) and discharges conditioned air (e.g., heated, cooled, dehumidified, filtered, and the like) that is supplied to the conditioned space. The air handling unit can be a dehumidifying air handling unit in which the conditioning of the air includes dehumidification.

In an embodiment, a dehumidifying air handling unit for an HVACR system includes a housing, a desiccant wheel, and a cooling heat exchanger. The housing includes an air inlet and an air discharge outlet. A main airflow path extends through the housing from the air inlet to the air discharge outlet. The desiccant wheel includes a first end disposed in the main airflow path, a second end disposed in the main airflow path downstream of the first end, and a metal organic framework ("MOF") desiccant. The desiccant wheel is configured to rotate to move the MOF desiccant between the first end and the second end of the desiccant wheel. The cooling heat exchanger is disposed in the main flow path downstream of the first end of the desiccant wheel and upstream of the second end of the desiccant wheel. The MOF desiccant has an majority absorption-desorption operating band of 25% relative humidity or less.

In an embodiment, a desiccant wheel is configured to be rotated within an air exchange unit of an HVACR system. The desiccant wheel includes a first end, a second end, and a MOF desiccant. The MOF desiccant is disposed on a surface of the desiccant wheel. Rotation of the desiccant wheel moves a position of the surface between the first end and the second end. The MOF desiccant has an majority absorption-desorption operating band of 25% relative humidity or less.

BRIEF DESCRIPTION OF THE DRAWINGS

Both described and other features, aspects, and advantages of an air handling unit and desiccant wheel will be better understood with the following drawings.

Figure 1:
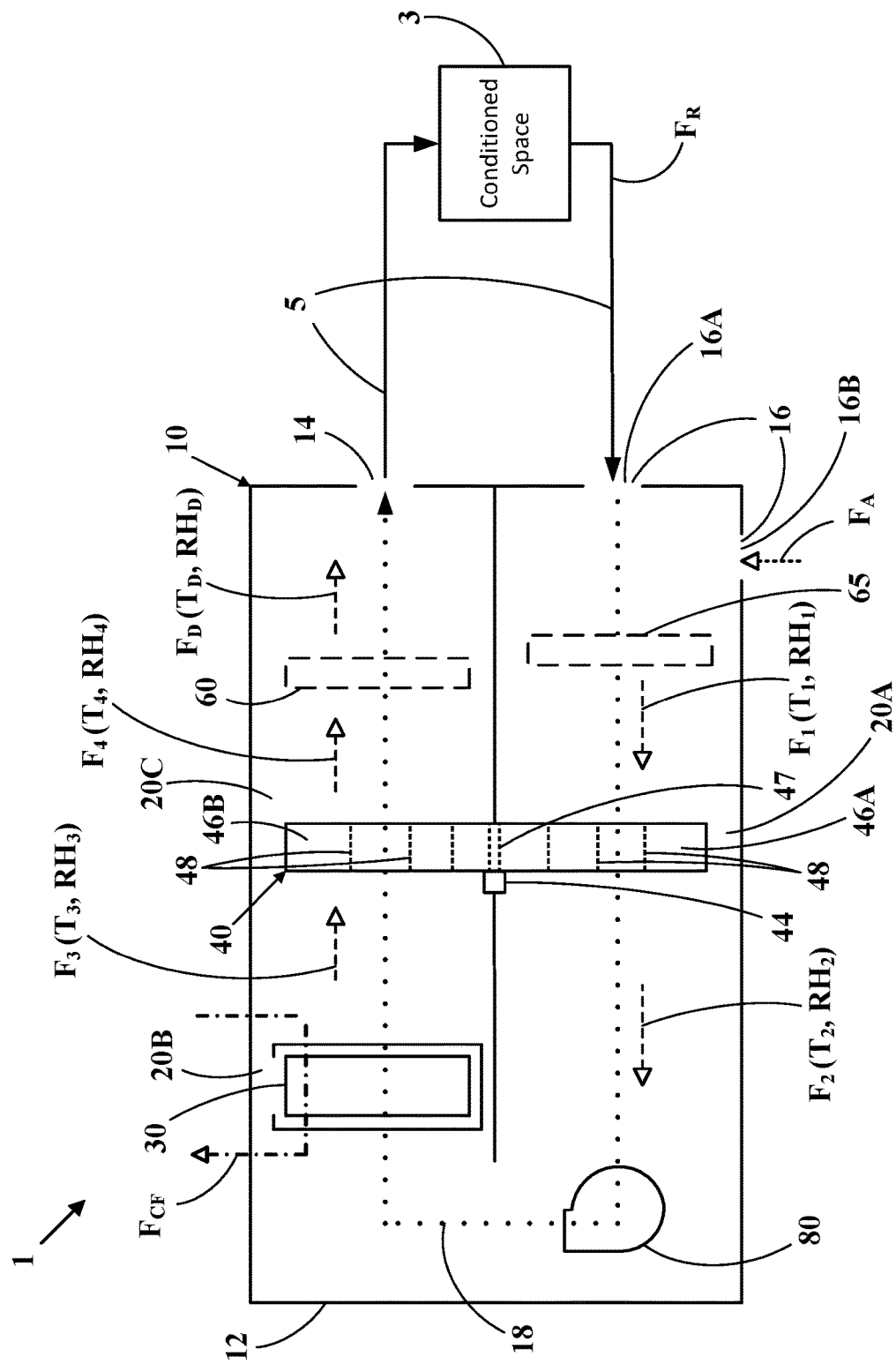
FIG. 1 is a schematic diagram of an embodiment of an HVACR system that includes an air handling unit with a desiccant wheel.

Like references in the drawings refer to like features.

DETAILED DESCRIPTION

FIG. 1 is a schematic diagram of an embodiment of a heating, ventilation, air conditioning, and refrigeration ("HVACR") system 1. The HVACR system 1 is configured to condition (e.g., heat, cool, dehumidify, and the like) a conditioned space 3 by supplying conditioned air to the conditioned space 3. The HVACR system can include a ductwork ventilation system 5 and an air handling unit ("AHU") 10. The AHU 10 is configured to provide conditioned air that conditions the conditioned space 3. For example, the AHU 10 is configured to discharge conditioned air at a particular temperature (e.g., at a predetermined temperature, within a predetermined temperature range, or the like) and at a particular humidity (e.g., at a predetermined humidity, within a predetermined humidity range, at a particular relative humidity, within a predetermined relative humidity range, or the like). For example, the particular temperature and humidity for the discharged conditioned air may be based on a difference(s) between a current temperature and/or a current humidity of the conditioned space 3 and a desired temperature and/or a desired humidity for the conditioned space 3.

The AHU 10 is connected to the conditioned space 3 by a ductwork ventilation system 5. Conditioned air discharged from the AHU 10 is directed to the conditioned space 3 through the ductwork ventilation system 5. The ductwork ventilation system 5 configured to distribute the conditioned air discharged from the AHU 10 to the conditioned space 3.

The AHU 10 includes a housing 12 with an air discharge outlet 14 and an air inlet 16. Air enters the AHU 10 through the air inlet 16, is conditioned as it flows through the AHU 10, and the conditioned air is discharged from the air discharge outlet 14. The AHU 10 conditions the air as it flows through the housing 12 from the air inlet 16 to the air discharge outlet 14. The conditioned air flows from the air discharge outlet 14 into the conditioned space 3. As shown in FIG. 1, the ductwork ventilation system 5 can be respectively connected to the air inlet 16 and the air discharge outlet 14 of the AHU 10. In an embodiment, the HVACR system 1 may include one or more air filters (not shown). The air filter(s) may be located within the AHU 10 and/or the ductwork ventilation system 5. For example, an air filter may be located within the housing 12 near the air inlet 16.

Air enters the AHU 10 through the air inlet 16. The air entering the air handling unit includes a flow of return air $F_R$ from the conditioned space 3 and a flow of ambient air $F_A$ (e.g., air from the external environment, outdoor air, the like). As shown in FIG. 1, the air inlet 16 can include a first air inlet 16A and a second air inlet 16B. For example, the air inlet 16 can be an air inlet section of the AHU 10 that includes the air inlets 16A, 16B of the AHU 10. The first inlet 16A is a return air inlet which is fluidly connected to the conditioned space 3. Return air $F_R$ from the conditioned space 3 flows into the housing 12 of AHU 10 through the first air inlet 16A. For example, the ductwork ventilation system 5 is connected to the first air inlet 16A. In an embodiment, the second air inlet 16B is an opening, vent, or inlet of the housing 12 that is fluidly connected to the ambient outside environment (e.g., the outside of a building, the external outdoor environment, and the like). Ambient air $F_A$ flows into the AHU 10 through the second air inlet 16B.

The AHU 10 includes a cooling heat exchanger 30 and a desiccant wheel 40 that are disposed within the housing 12. The air flows through the desiccant wheel 40 and the cooling heat exchanger 30 as the air flows from the air inlet 16 to the air discharge outlet 14 within the housing 12. The AHU 10 can also include one or more fan(s) 80 that blow and direct air through the housing 12. As shown in FIG. 1, a fan 80 can be disposed within the housing 12.

In an embodiment, the AHU 10 has a cooling mode. In the cooling mode, air enters the housing 12 of the AHU, is cooled and dehumidified within the AHU 10, and the cooled and dehumidified air is then discharged from the housing 12 and to conditioned space 3. In the cooling mode, the heat exchanger 30 is a cooling heat exchanger which cools the air and the desiccant wheel 40 dehumidifies the air. In an embodiment, the AHU 10 may include a heater 65 (e.g., an electric heater, a combustion heater, or the like) for heating the air before it passes through the desiccant wheel 40. The heater 65 disposed upstream of the first end 46A of the desiccant wheel 40. The heater 65 can be used to improve the effectiveness of the desorption of the water from the desiccant into the air. Relative to previous desiccants, the desiccant in the desiccant wheel 40 at least reduces the amount of heating provided by the heater 65 relative to conventional desiccants. This can advantageously reduce the amount of power utilized by the AHU 10 and the HVACR system 1 to condition the conditioned space 3. In some embodiment, the desiccant is able to provide the dehumidifying without the heater 65. The desiccant in the desiccant wheel 40 is In an embodiment, the AHU 10 has a heating mode that heats the air flowing through the AHU 10. In an embodiment, the AHU may be configured to operate the heat exchanger 30 as a heat pump to heat the air as it passes through/along the heat exchanger 30. In an embodiment, the AHU 10 may also include a heater 60 (e.g., an electric heater, a combustion heater, or the like) for heating the air in a heating mode. The heater can be disposed downstream of the first end 46A of the desiccant wheel 40.

In an embodiment, the AHU 10 may have a no air recycle configuration in which the AHU 10 does not utilize any return air $F_R$ (e.g., the AHU 10 utilizes 100% ambient air $F_A$). The no air recycle configuration may be utilized by the AHU 10 in any one of its various modes (e.g., heating mode, cooling mode, and the like). For example, the no air recycle configuration may block the first air inlet 16A for the return air $F_R$. In such an embodiment, the AHU 10 may include an air-to-air heat exchanger (not shown) and/or a cooler (not shown) (e.g., a cooling heat exchanger) disposed between the second air inlet 16B and the first end 46A of the desiccant wheel 40. In an embodiment, the air-to-air heat exchanger and the cooler can be disposed upstream of the heater 65. The air-to-air heat exchanger has a first pathway and a fluidly separate second pathway in a heat exchange relationship (e.g., a shell side pathway and a tube side pathway, or the like). The air flows from the second inlet 16A through the first pathway of the heat exchanger, through the cooler, then through the second pathway of the heat exchanger.

The AHU 10 has a main airflow path 18 that extends through the housing 12 from the air inlet 16 to the air discharge outlet 14. Air entering the AHU 18 (e.g., the return air $F_R$ and the ambient air $F_A$ which are to be conditioned) flows from the air inlet 16 to the air discharge outlet 14 by traveling through the main airflow path 18. In an embodiment for a cooling mode, the air is dehumidified and cooled as it flows through the main airflow path 18.

The main airflow path 18 includes a plurality of airflow sections. In particular, the main airflow path 18 includes a first airflow section 20A, a second airflow section 20B, and a third airflow section 20C. The first, second, and third airflow sections 20A, 20B, 20C are arranged in that order within the main airflow path 18. With respect to the flow of air through the main airflow path 18 (e.g., the air flowing from the air inlet 16 to the air discharge outlet 14): the second airflow section 20B and third airflow section 20C are each downstream of the first airflow section 20A, and the third airflow section 20C is downstream of the second airflow section 20B. The second airflow section 20B is disposed between the first airflow section 20A and the third airflow section 20C along and within the main airflow path 18. The air flows from the air inlet 16 into the first air flow section 20A. The air then flows from the first airflow section 20A to the second airflow section 20C. The air then flows from the second airflow section 20B to the third airflow section 20C. The air then flows from the third airflow section 20C to the air discharge outlet 14

The desiccant wheel 40 is rotatable within the housing 12. The AHU 10 includes a motor 44 configured to rotate the desiccant wheel 40 relative to the housing 12. The desiccant wheel 40 can be supported on a shaft 42. In an embodiment, the desiccant wheel can have a wheel shape. The general shapes and rotation for a desiccant wheel within an HVACR system is generally known within the art. For example, the shaft 42 extending through the desiccant wheel 40 at or near its center point. In an embodiment, the desiccant wheel 40 may be affixed to the shaft 42, and the motor 44 is configured to rotate the shaft 42. In another embodiment, the desiccant wheel 40 may be configured to be rotatable supported on the shaft 42, and the motor 44 may be configured to apply a force that rotates the desiccant wheel 40 on the shaft 42. For example, the motor 44 can rotate a roller, gear, or the like, that is in contact with a circumferential surface of the desiccant wheel 40.

During operation, the desiccant wheel 40 rotates within the first airflow section 20A and the third airflow section 20C. The desiccant wheel 40 has a first end 46A and a second end 46B that are opposite ends, with respect to the airflow sections 20A and 20C. The first end 46A and the second end 46B are opposite each other along the diameter of the desiccant wheel 40. The first end 46A is disposed in the first airflow section 20A and the second end 46B is disposed in the third airflow section 20C. The desiccant wheel 40 has a plurality of sectors. For example, a sector generally has a wedge shape. As the desiccant wheel 40 rotates, each sector is recurrently moved from being in the first airflow section 20A to being in the third airflow section 20C and then back to being in the first airflow section 20A.

As it rotates, the desiccant wheel 40 adsorbs moisture from the air in the third airflow section 20C, and releases moisture into the air in the first airflow section 20A. The moisture adsorbed by the desiccant while disposed in the third airflow section 20C is de-adsorbed/released into the air flowing through the first airflow section 20A.

The heat exchanger 30 is disposed in the second airflow section 20B. The air flows across the heat exchanger 30

(e.g., through channels in the cooling heat exchanger 30, along outer tube surfaces of the cooling heat exchanger 30, and the like) as the air flows through the second airflow section 20B. In an embodiment, the heat exchanger 30 adsorbs heat from the air and cools the air as the air flows across the heat exchanger 30. A colder fluid $F_{CF}$ separately flows through the heat exchanger 30 and adsorbs heat from the air flows across the heat exchanger 30. In an embodiment, the colder fluid $F_{CF}$ can be, for example but not limited to, a chiller fluid, an expanded refrigerant, and the like. The heat exchanger 30 may be an evaporator in a refrigerant circuit. In an embodiment, the heater 65 and/or the heater 60 may be a condenser for the refrigerant circuit that includes the heat exchanger 30 as an evaporator or for in a refrigerant circuit used to cool the colder fluid $F_{CF}$.

As discussed above the AHU 10 conditions air $F_1$ that is a mixture of return air $F_R$ and ambient air $F_A$. The ambient air $F_A$ generally has higher moisture content than the return air $F_R$. The temperature and relative humidity of the ambient air $F_A$ can vary depending upon, for example, the geographic location, season, and current weather at the location in which the HVACR system 1 is being employed. The ambient air $F_A$ has a significantly higher moisture content in more humid climates (e.g., locations closer to the equator, locations near the ocean, island locations, and the like). The AHU 10 may be utilized to dehumidify, for example, ambient air $F_A$ with a temperature of at or about 20° C. to at or about 40° C. and a relative humidity ("RH") that is from at or about 30% to at or about 80%. For example, the ambient air $F_A$ can be ~32° C. and ~55% relative humidity ("RH").

The air flowing through the third airflow section 20C is at a lower temperature than the air flowing through the first airflow section 20A. The temperature difference increases the relative humidity of the air. The cooled air flowing into the third airflow section 20C has a higher relative humidity. In an embodiment, the cooled air flowing into the third airflow section 20C from the second section 20B has a relative humidity that is about 80% or greater.

The desiccant wheel 40 includes channels 48 that extend through the thickness of the desiccant wheel 40. The air flows through the desiccant wheel 40 by flowing through its channels 48. The desiccant wheel 40 includes a large number of the channels 48. For example, the desiccant wheel 40 can include at least one hundred of the channels 48. In some embodiment, a desiccant wheel 40 can includes thousands (i.e., at least a thousand) of the channels 48. The channels 48 rotate along with the rotation of the desiccant wheel 40. For example, the rotation causes a channel 48 to recurrently from disposed in the first airflow section 20A, to disposed in the third airflow section 20C, and then disposed back in the first airflow section 20A.

The desiccant wheel 40 includes a desiccant. The desiccant is coated on the surfaces/sides of the channels 48. The air flows across the desiccant as it flows through the channels 48 of the desiccant wheel 40. The coating of the desiccant is discussed in more detail below. The desiccant is configured to switch between adsorbing water and desorbing water as the desiccant is rotated on desiccant wheel 40. The exposure of the desiccant on the desiccant wheel 40 to a flow of air causes water desorption into the air (e.g., the air to hold water from the desiccant) can also be referred to as regenerating the desiccant. The properties of the desiccant are described in more detail below.

As it flows along the main air flow path 46A, the air flows through the first end 46A of the desiccant wheel 40, then along the cooling heat exchanger 30, and then flows through the second end 46B of the desiccant wheel 40. The air $F_1$ flowing into the first airflow section 20A has a relative humidity of at least ~50% and is at a temperature of at least 25° C. In an embodiment, the air $F_1$ flowing in the first airflow section 20A has a relative humidity $RH_1$ from ~50% to ~75% and a temperature $T_1$ from ~25° C. to ~27° C.

In an embodiment, the air is cooled as it flows over/through the heat exchanger 30 in the second airflow section 20B. Some of the moisture in the air may condense as the air flows past/through the heat exchanger 30. The condensed moisture can flow into a drip tray of the heat exchanger 30. The cooled air $F_3$ flowing from the second airflow section 20B and into the third airflow section 20C can have a temperature $T_3$ from ~10° C. to ~14° C. and a relative humidity $RH_3$ from ~80% to ~95%.

The air then flows over/through the second end 46B of the desiccant wheel 40. The desiccant in the second end 46A adsorbs moisture from the air as it flows through the third airflow section 20C. The dehumidified air $F_4$ after flowing over/through the second end 46B of the desiccant wheel 40 has a temperature $T_4$ from ~14° C. to ~19° C. and a relative humidity $RH_3$ of ~65%. The air then flows to the air discharge outlet 14. The conditioned air FD discharged from the AHU 10 can have can have a temperature $T_D$ from of 14-19° C. and a relative humidity $T_D$ of 65% or less. The desiccant wheel 40 includes a metal-organic framework ("MOF") desiccant. A MOF desiccant includes metal ions, and/or clusters of metal ions, bound together with an organic linker. In an embodiment, the organic linker can be a ligand. In an embodiment, the MOF desiccant is applied in the form of a coating applied to at least one surface of the desiccant wheel 40. As shown in FIG. 1, the desiccant wheel 40 can include a frame 50 and the coating can be applied to the frame 50 of the desiccant wheel 40. For example, the coating applied to the channels 48 formed in the frame 50 of the desiccant wheel 40. The coating is a desiccant composition that includes the MOF desiccant and a binder. In an embodiment, the surface is a metal surface of the desiccant wheel 40.

Figure 2A:
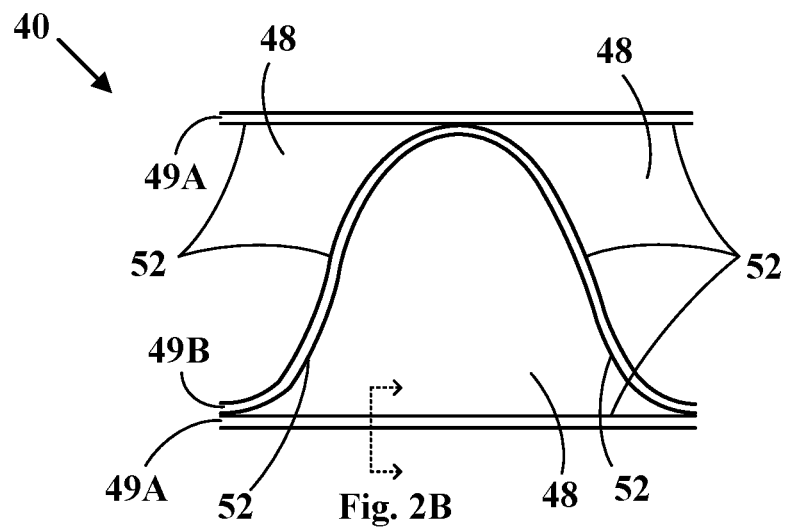
FIG. 2A is a partial schematic front view of channels in an embodiment of a desiccant wheel.

FIG. 2A is a partial schematic front view of a plurality of the channels 48 in the desiccant wheel 40, according to an embodiment. The channels 48 extending into the page in FIG. 2A The frame 40 includes a plurality of substrates 49A, 49B that form the channels 48. For example, a fluted substrate 49B can be stacked between a pair of flat substrates 49A to form the channels 48 as shown in FIG. 2A. The substrates 49A can be metal sheets coated with the desiccant. The channels 48 in FIG. 2A have a triangular cross-section. However, it should be understood that the channels 48 in other embodiment may have different shapes. The channels 48 of the desiccant wheel 40 include surface one of more surfaces 52 coated with desiccant. Air flows contacts and flows across the surfaces 52 as it flows through the channels 48 of the desiccant wheel.

Figure 2B:
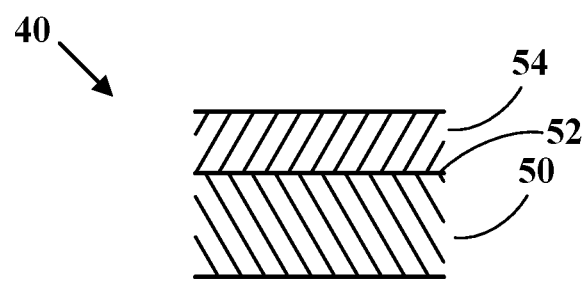
FIG. 2B is a cross-section of one of the channels of the desiccant wheel in FIG. 2A, according to an embodiment

FIG. 2B is a cross-section of a channel 48 of the desiccant wheel 40 as indicated in FIG. 2A, according to an embodiment. As shown in FIG. 2B, a coating 54 of the desiccant composition is applied to one or more surfaces 52 of the desiccant wheel 50. For example, the coating 54 is applied to the frame 50 of the desiccant wheel 40 (e.g., the metal plates/substrates that form the channels 48 of the frame 50). In an embodiment, the surface(s) 52 are metal surface(s) of the frame 50 of the desiccant wheel 40. The coating 54 can be formed by applying (e.g., coating, spraying, or the like) an application mixture that includes the desiccant composition and solvent to the surface(s) 52 of the desiccant wheel 40. The application mixture then dries on the surface(s) 52 to form the coating 52. In an embodiment, the application mixture contains less than 10 wt % of the solvent. In an embodiment, the solvent is a non-aromatic solvent. In an embodiment, the solvent is a non-aromatic alcohol or water.

The binder is used to adhere the MOF desiccant to the surface(s) 52 of the frame 50 of the desiccant wheel 40. The binder also provides the coating 52 with cohesion to the surface(s) 52 of the frame 50. The binder configured to provide cohesion capable of withstanding the continuous vibration that occurs due to the rotation of the desiccant wheel 40. The coating 52 also has temperature and humidity stability over the temperatures and humidities that can occur within the AHU 10.

In an embodiment, the binder in the desiccant composition is polyvinyl butyral. For example, polyvinyl butyral binder has found to have an advantageous compatibility with the relatively narrow RH band MOF desiccant of the desiccant wheel 40. For example, polyvinyl butyral binder was found to provide good cohesion while having a low impact on the water uptake of the relatively narrow RH band MOF desiccant. In an embodiment, the coating 52 contains 10 wt % or less of binder. Coatings containing more than 10 wt % of binder were found to cause the coating 52 to either flake off from the frame 50 and/or have a significantly impact the water uptake capacity of the MOF desiccant. In an embodiment, a coating containing AL-MIL-68-Mes MOF and 10% of less of polyvinyl butyral binder was found to have good water uptake and adherence.

In an embodiment, the desiccant composition includes less than 8.0 wt % of the binder. In an embodiment, the desiccant composition includes 7.8 wt % or less of the binder. In an embodiment, the desiccant composition includes 5.5 wt % of the binder. In an embodiment, the desiccant composition includes at or about 2.7 wt % of the binder.

The MOF desiccant is a desiccant that has an adsorption isotherm and a desorption isotherm that each have an "S" shape. This type of "S" shaped isotherm is referred to as a Type V isotherm. Accordingly, a desiccant with "S" shaped absorption and desorption isotherms can be referred to as Type V desiccant. A desiccant has an uptake capacity that describes how much water the desiccant can adsorb. Uptake capacity varies with the humidity of the air flowing to/along the desiccant. The adsorption isotherm illustrates the relationship between uptake capacity and relative humidity when dry MOF desiccant is adsorbing water from air. The desorption isotherm illustrates the relationship between uptake capacity and relative humidity when water containing MOF desiccant is desorbing water. In particular, the s-shaped isotherms of the MOF desiccant each include an steep middle section.

An absorption inflection point is the point in the adsorption isotherm at which the water uptake capacity increases and transitions from the steep middle section. For example, the point in the adsorption isotherm at which the water uptake capacity is no longer exponentially increasing. The desorption inflection point is the transition point in the desorption isotherm at which the water uptake capacity decreases and transitions out of the steep middle section. For example, the point in the desorption isotherm at which the water uptake capacity is no longer exponentially decreasing.

Desiccants have an absorption-desorption operating band that is the relative humidity range defined by an upper end point at which the desiccant is configured to operate to adsorb moisture and a lower end point at which the desiccant is configured to desorb moisture into air. Type V desiccants can have an majority absorption-desorption operating band that is the humidity range defined by the steep middle sections of the adsorption isotherm and the desorption isotherm. The majority absorption-desorption operating band is the humidity range defined by the end of the exponential decrease in the desorption isotherm and the end of the exponential increase in the adsorption isotherm (e.g., the humidity range that has a lower end point of the desorption inflection point and an upper end point of the adsorption inflection point). The majority absorption-desorption operating band includes an uptake capacity change of at least 50% of the maximum uptake capacity of the desiccant. In an embodiment, the desiccant wheel 40 contains an MOF desiccant with an majority absorption-desorption operating band in which the uptake capacity changes by at least 60% of the maximum uptake capacity of the MOF desiccant The MOF desiccant in the desiccant wheel 40 has an adsorption isotherm and desorption isotherm that operate in relatively narrower absorption-desorption relative humidity operating band. In an embodiment, the MOF desiccant has a majority operating band of 25% relative humidity or less. For example, the MOF desiccant has an uptake capacity change of at least 50% of its maximum uptake capacity within 25% relative humidity or less. In another embodiment, the MOF desiccant has an operating band of 20% relatively humidity or less. In an embodiment, the MOF desiccant has an exponential operating band of 15% relative humidity or less.

The adsorption isotherm has a steep middle section. In an embodiment, the adsorption isotherm section has at least a portion with a slope of at least 80 degrees relative to horizontal. In an embodiment, the steep middle section has at least a portion with a slope of at least 85 degrees relative to horizontal. In an embodiment, the portion of the adsorption isotherm is along a range of at least 2% of relative humidity.

The MOF desiccant can have an adsorption inflection point that occurs between 50% and 80% relative humidity. In an embodiment, MOF desiccant has an adsorption inflection point that occurs between 65% and 75% relative humidity.

The MOF desiccant can have a desorption inflection point that occurs between 40% and 60% relative humidity. In an embodiment, the MOF desiccant has a desorption inflection point that is between 40% and 55% relative humidity.

The MOF desiccant in desiccant wheel 40 is a type V MOF desiccant with an absorption-desorption operating band having one or more of the properties described above (e.g., a narrower majority absorption-desorption operating band, an adsorption inflection point, desorption inflection point location, a minimum change over the operating band). In an embodiment, the MOF desiccant is a type V MOF desiccant with an absorption-desorption operating band having at least the narrower majority relative humidity operating band described above. In an embodiment, the MOF desiccant is a type V MOF desiccant with an majority absorption-desorption operating band having at least the narrower majority relative humidity operating band and the uptake capacity change within its majority operating band as described above. In an embodiment, the MOF desiccant is a type V MOF desiccant with an majority absorption-desorption operating band having at least the narrower majority relative humidity operating band, the adsorption inflection point, and a desorption inflection point as described above.

The MOF desiccant in desiccant wheel 40 can be, for example but not limited to, AL-MIL-68-Mes MOF and/or CAU-3-BDC (AL) MOF. AL-MIL-68-Mes MOF and CAU-3-BDC (AL) MOF are provided as examples. It would be appreciated that the MOF desiccant can be other type V MOFs that have absorption-desorption properties as described herein.

Figure 3:
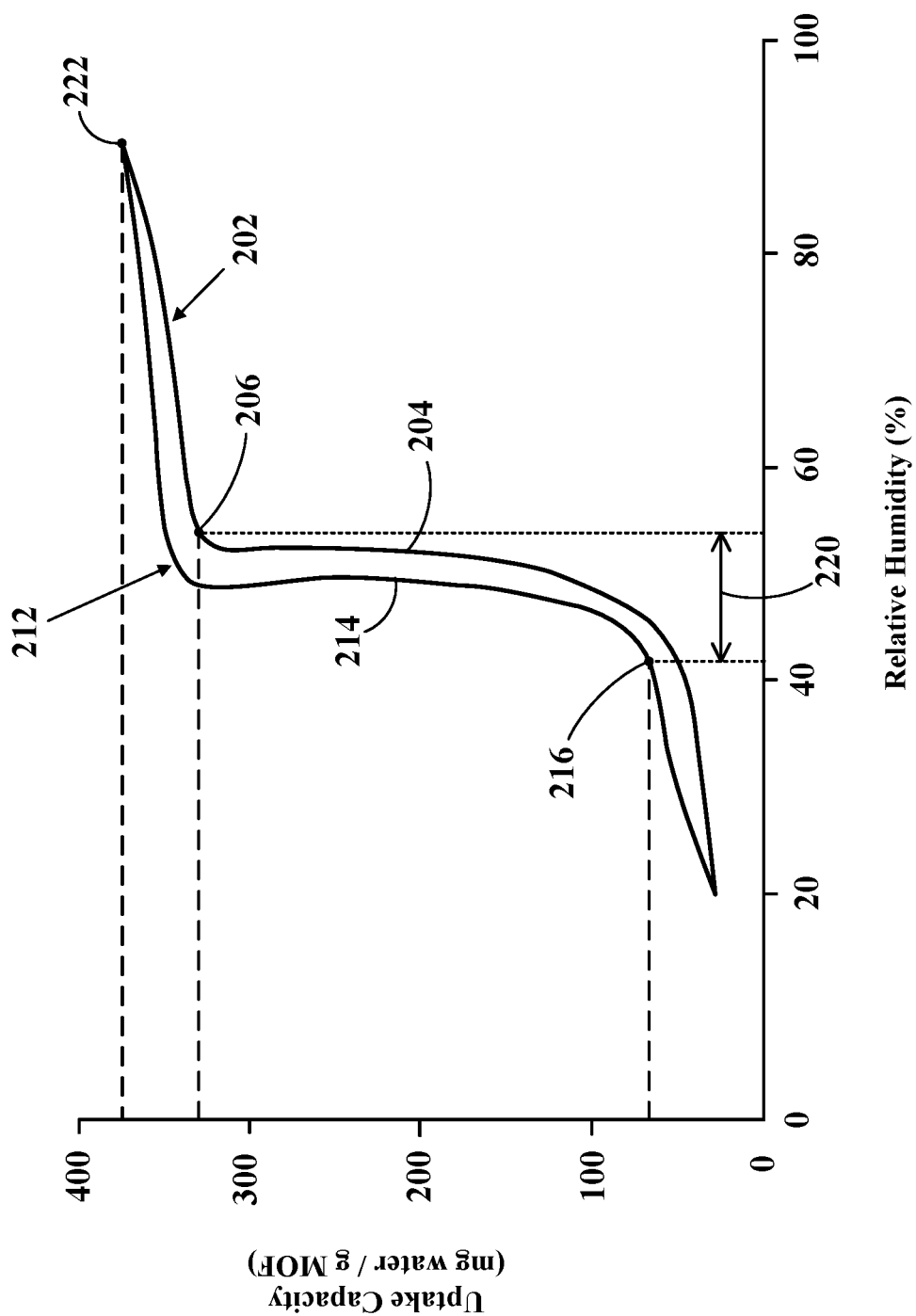
FIG. 3 is a graph of isotherms for an embodiment of an MOF desiccant for a desiccant wheel.

FIG. 3 is a graph illustrating adsorption and desorption for AL-MIL-68-Mes MOF (referred "AL-68 MOF"). The graph in FIG. 3 shows an adsorption isotherm 202 and a desorption isotherm 212 for the AL-68 MOF. The adsorption isotherm 202 shows the water uptake capacity of the AL-68 MOF at different relative humilities. The AL-68 MOF is a type V desiccant that has an S shaped adsorption isotherm 202 and an S shaped desorption isotherm 212.

The water uptake capacity of AL-68 MOF was tested at a series of increasing relative humilities. For example, air at a specific relative humidity is supplied through/to a sample of AL-68 MOF powder and then the mass of the sample of AL-68 MOF powder (with its adsorbed water) is used to determine the amount of water adsorbed by the powder. This testing data was plotted on a graph of uptake vs. relative humidity (e.g., the graph in FIG. 3) and a curved trend line was fit to the data points to generate the adsorption isotherm 202. After reaching the maximum water uptake capacity of the sample AL-68 MOF, the testing process was conducted in reverse at a series of decreasing relative humidities to determine the desorption isotherm 212. The water uptake capacity of the AL-68 MOF was measured at 25° C. and standard pressure (1 atm).

Each of the s-shaped isotherms 202, 212 includes an steep middle section 204, 214. The adsorption isotherm 202 includes an steep middle section 204 and an adsorption inflection point 206. The steep middle section 204 is middle portion of the S-shape that is disposed between the two tail sections of the S-shape. The steep middle section 204 is the portion in which the adsorption isotherm 202 exponentially increases (e.g., the portion in which the water uptake of the AL-68 MOF increases exponentially. The absorption inflection point 206 is the point in the adsorption isotherm 202 at which the adsorption isotherm 202 is no longer increasing exponentially. For example, the inflection point 206 is the point at which the adsorption isotherm stops increasing exponentially and begins to level off.

The desorption isotherm 212 includes an steep middle section 214 and a desorption inflection point 216. The steep middle section 214 is middle portion of the S-shape that is disposed between the two tail sections of the S-shape. The steep middle section 204 is the portion in which the uptake of the desorption isotherm 212 exponentially decreases (e.g., the portion in which the water uptake of the AL-68 MOF decreases exponentially). The desorption inflection point 216 is the point in the adsorption isotherm 202 at which the desorption isotherm 212 is no longer decreasing exponentially. For example, the desorption inflection point 216 is the point at which the desorption isotherm 212 stops decreasing exponentially.

As shown in FIG. 3, the adsorption inflection point 206 occurs at or about 55% relative humidity, at which the AL-68 MOF has an uptake capacity of 330 mg water per 1 g of the MOF. The desorption inflection point 216 occurs at or about 43% relative humidity, at which the AL-68 MOF has an uptake capacity of 67 mg water per gram of the AL-68 MOF. The AL-68 MOF has an exponential absorption-desorption operating band 220 of 12% relative humidity (e.g., 55%–43%). The AL-68 MOF has a maximum uptake capacity 222 of 375 mg water per gram of the AL-68 MOF (e.g., 375 [mg water]/[1 g MOF]. The uptake capacity of the AL-68 MOF changes by ~70% of its maximum uptake capacity 222 across its majority operating band (e.g., [330 mg/g–67 mg/g]/[375 mg/g]=70%). The uptake capacity of the AL-68 MOF decreasing by ~80% across its smaller majority absorption-desorption operating band. This can be advantageous as it allows for air with a higher humidity (e.g., the air $F_1$ in FIG. 1) to be used to provide significant regeneration of the desiccant.

Figure 4:
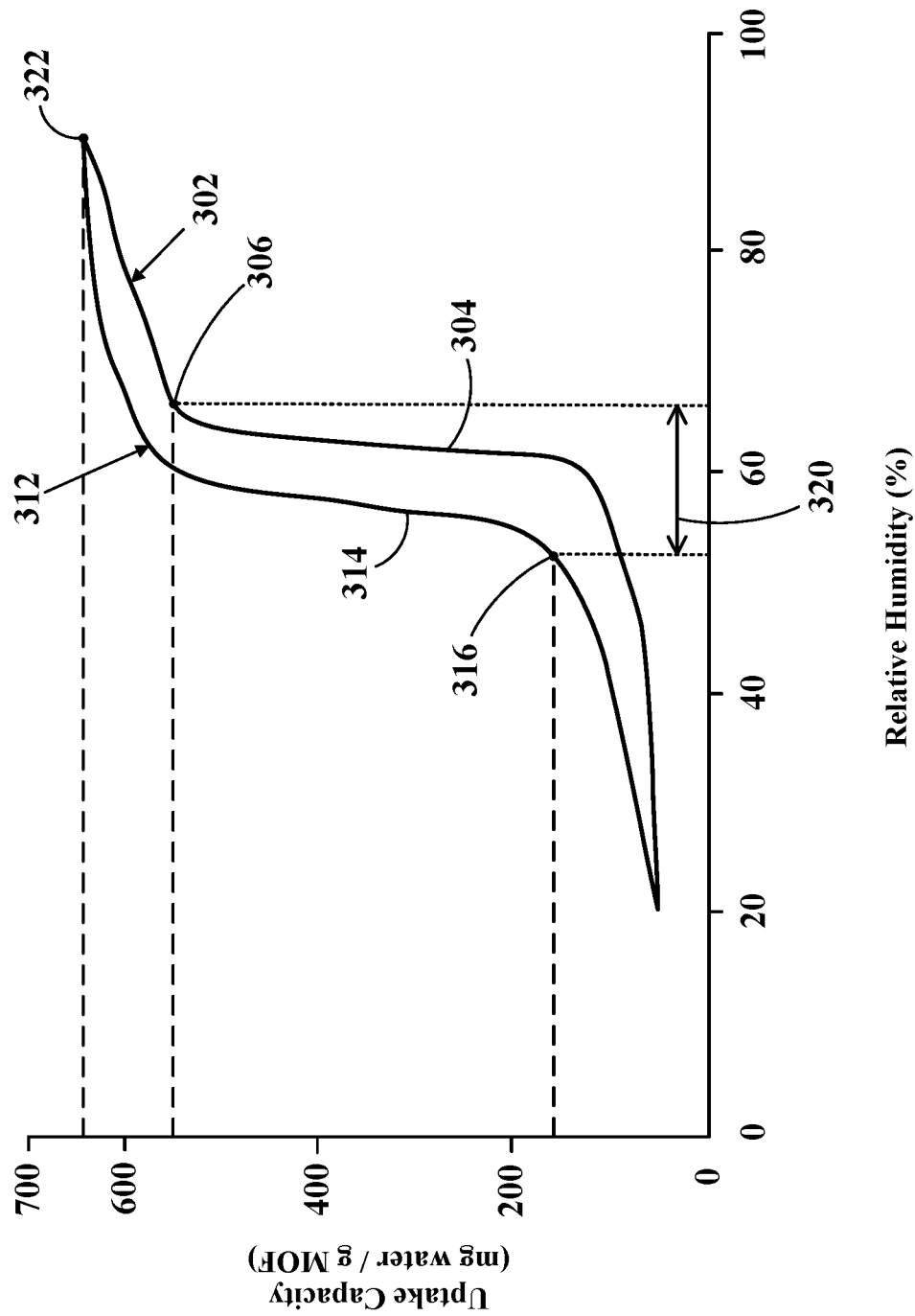
FIG. 4 is a graph of isotherms for another embodiment of an MOF desiccant for a desiccant wheel.

FIG. 4 is a graph illustrating adsorption and desorption for a CAU-3-BDC (AL) MOF (herein referred to as "second MOF desiccant"). The graph in FIG. 4 shows an adsorption isotherm 302 and a desorption isotherm 312 for the second MOF desiccant. The adsorption isotherm 302 shows the water uptake capacity of the second MOF desiccant at different relative humilities. The second MOF desiccant is a type V desiccant that has an S shaped adsorption isotherm 302 and an S shaped desorption isotherm 312. The adsorption isotherm 302 and a desorption isotherm 312 were determined for the second MOF desiccant in the same manner as discussed above for the MIL-68-Mes MOF.

Each of the s-shaped isotherms 302, 312 have the same general structure as described above for s-shaped isotherms 202, 212 in FIG. 3. For example, the adsorption isotherm 302 includes an steep middle section 304 and an adsorption inflection point 306, and the desorption isotherm 312 includes an steep middle section 314 and a desorption inflection point 316.

As shown in FIG. 4, the adsorption inflection point 306 occurs at or about 67% relative humidity, at which the second desiccant MOF has an uptake capacity of 550 mg water per 1 g of the MOF. The desorption inflection point 316 occurs at or about 53% relative humidity, at which the second desiccant MOF has an uptake capacity of 158 mg water per gram of the MOF. The second desiccant MOF has a majority absorption-desorption operating band of 14% relative humidity (e.g., 67%–54%). The second desiccant MOF has a maximum uptake capacity 322 of 633 mg water per gram of the MOF (e.g., 633 [mg water]/[1 g MOF]. The uptake capacity of the second desiccant MOF changes by ~62% of its maximum uptake capacity across its majority absorption-desorption operating band (e.g., [550 mg/g–158 mg/g]/[633 mg/g]=62%). The uptake capacity of the MIL-68-Mes MOF decreases by ~72% across its smaller majority absorption-desorption operating band.

In conventional dehumidifying AHUs, the temperature and relative humidity of the inlet air was not sufficient for regenerating the conventional desiccant. The conventional AHU would include a heater upstream of the first end 46A of the desiccant wheel 40 so that heated inlet air capable of sufficiently regenerating the conventional desiccant flows through the first end 46A. As shown in FIG. 1, the AHU 10 in an embodiment does not include a heater between the air inlet 16 and the first end 46A of the desiccant wheel 40, and does not heat the return air or the ambient air provided to the first end 46A of the desiccant wheel 40.

The MOF desiccant in desiccant wheel 40 advantageous allows for cooling and dehumidifying air without needing to provide heated air (e.g., providing a heat element, a heating heat exchanger, and the like) to regenerate the desiccant. This advantageously allows for the AHU 10 to have a reduced latent load. The MOF desiccant also has a higher efficiency than previous desiccants which advantageously allows for less desiccant to be used and for the desiccant wheel to be lighter.

Aspects:

Any of Aspects 1-11 may be combined with any of aspects 12-17.

Aspect 1. A dehumidifying air handling unit for an HVACR system, comprising: a housing including an air inlet and an air discharge outlet, a main airflow path extending through the housing from the air inlet to the air discharge outlet; a desiccant wheel including a first end disposed in the main airflow path, a second end disposed in the main airflow path downstream of the first end, and a metal organic framework ("MOF") desiccant, the desiccant wheel rotatable to move the MOF desiccant between the first end and the second end of the desiccant wheel, the MOF desiccant having an majority absorption-desorption operating band of 25% relative humidity or less; and a cooling heat exchanger disposed in the main flow path downstream of the first end of the desiccant wheel and upstream of the second end of the desiccant wheel.

Aspect 2. The dehumidifying air handling unit of Aspect 1, wherein the MOF desiccant positioned at the second end of the desiccant wheel is configured to adsorb water from air flowing through the main airflow path, and the MOF desiccant positioned at the first end of the desiccant wheel configured to desorb water into the air flowing through the main airflow path.

Aspect 3. The dehumidifying air handling unit of either one of Aspects 1 or 2, wherein the air flowing through the main airflow path flows along the first end of the desiccant wheel.

Aspect 4. The dehumidifying air handling unit of any one of Aspects 1-3, wherein the MOF desiccant positioned at the first end is configured to desorb the water into the air having a temperature of 40° or less.

Aspect 5. The dehumidifying air handling unit of any one of Aspects 1-4, wherein the AHU does not have a heater disposed in the main airflow path downstream of the air inlet and upstream of the first end of the desiccant wheel.

Aspect 6. The dehumidifying air handling unit of any one of Aspects 1-5, wherein the MOF desiccant has an adsorption isotherm with an adsorption inflection point that occurs between 50% and 80% relative humidity.

Aspect 7. The dehumidifying air handling unit of any one of Aspects 1-6, wherein the MOF desiccant has a desorption isotherm with a desorption inflection point that occurs between 40% and 60% relative humidity.

Aspect 8. The dehumidifying air handling unit of any one of Aspects 1-7, wherein the MOF desiccant has a maximum uptake capacity, and uptake capacity of the MOF desiccant changes within the majority absorption-desorption operating band of the MOF desiccant by at least 50% of the maximum uptake capacity of the MOF desiccant.

Aspect 9. The dehumidifying air handling unit of any one of Aspects 1-8, wherein the MOF desiccant has an "S" shaped adsorption isotherm.

Aspect 10. The dehumidifying air handling unit of any one of Aspects 1-9, wherein the desiccant wheel includes a coating on a surface of the desiccant wheel, the coating including the MOF desiccant and a binder, the coating containing 10 wt % or less of the binder.

Aspect 11. The dehumidifying air handling unit of any one of Aspects 1-10, further comprising: a motor disposed in the housing, the motor configured to rotate the desiccant wheel.

Aspect 12. A desiccant wheel for an air exchange unit of an HVACR system, the desiccant wheel configured to be rotated within the air exchange unit, the desiccant wheel comprising: a first end and a second end; a metal organic framework ("MOF") desiccant disposed on a surface of the desiccant wheel, the rotation of the desiccant wheel configured to move a position of the surface between the first end and the second end, the MOF desiccant having an majority absorption-desorption operating band of 25% relative humidity or less.

Aspect 13. The desiccant wheel of Aspect 12, wherein the MOF desiccant has an adsorption isotherm with an adsorption inflection point that occurs between 50% and 80% relative humidity.

Aspect 14. The desiccant wheel of either one of Aspects 12 or 13, wherein the MOF desiccant has a desorption isotherm with a desorption inflection point that occurs between 40% and 60% relative humidity.

Aspect 15. The desiccant wheel of any one of Aspects 12-14, wherein the MOF desiccant has a maximum uptake capacity, and uptake capacity of the MOF desiccant changes within the majority absorption-desorption operating band of the MOF desiccant by at least 50% of the maximum uptake capacity of the MOF desiccant.

Aspect 16. The desiccant wheel of any one of Aspects 12-15, wherein the MOF desiccant has an "S" shaped adsorption isotherm.

Aspect 17. The desiccant wheel of any one of Aspects 12-16, comprising: a frame including the surface; and a coating disposed on the surface of the frame, the coating including the MOF desiccant and a binder, and the coating containing 10 wt % or less of the binder.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A dehumidifying air handling unit for a heating, ventilation, air conditioning, and refrigeration system, comprising:
    a housing including an air inlet and an air discharge outlet, a main airflow path extending through the housing from the air inlet to the air discharge outlet;
    a desiccant wheel including a first end disposed in the main airflow path, a second end disposed in the main airflow path downstream of the first end, and a metal organic framework ("MOF") desiccant, the desiccant wheel rotatable to move the MOF desiccant between the first end and the second end of the desiccant wheel, the MOF desiccant having a majority absorption-desorption operating band of 25% relative humidity or less; and
    a cooling heat exchanger disposed in the main flow path downstream of the first end of the desiccant wheel and upstream of the second end of the desiccant wheel.

2. The dehumidifying air handling unit of claim 1, wherein
    the MOF desiccant positioned at the second end of the desiccant wheel is configured to adsorb water from air flowing through the main airflow path, and
    the MOF desiccant positioned at the first end of the desiccant wheel is configured to desorb water into the air flowing through the main airflow path.

3. The dehumidifying air handling unit of claim 2, wherein the air flowing through the main airflow path flows along the first end of the desiccant wheel.

4. The dehumidifying air handling unit of claim 2, wherein the MOF desiccant positioned at the first end is configured to desorb the water into the air having a temperature of 40° or less.

5. The dehumidifying air handling unit of claim 1, wherein the air handling unit does not have a heater disposed in the main airflow path downstream of the air inlet and upstream of the first end of the desiccant wheel.

6. The dehumidifying air handling unit of claim 1, wherein the MOF desiccant has an adsorption isotherm with an adsorption inflection point that occurs between 50% and 80% relative humidity.

7. The dehumidifying air handling unit of claim 1, wherein the MOF desiccant has a desorption isotherm with a desorption inflection point that occurs between 40% and 60% relative humidity.

8. The dehumidifying air handling unit of claim 1, wherein the MOF desiccant has a maximum uptake capacity, and uptake capacity of the MOF desiccant changes within the majority absorption-desorption operating band of the MOF desiccant by at least 50% of the maximum uptake capacity of the MOF desiccant.

9. The dehumidifying air handling unit of claim 1, wherein the MOF desiccant has an "S" shaped adsorption isotherm.

10. The dehumidifying air handling unit of claim 1, wherein the desiccant wheel includes a coating on a surface of the desiccant wheel, the coating including the MOF desiccant and a binder, the coating containing 10 wt % or less of the binder.

11. The dehumidifying air handling unit of claim 1, further comprising:
a motor disposed in the housing, the motor configured to rotate the desiccant wheel.

12. A desiccant wheel for an air handling unit of a heating, ventilation, air conditioning, and refrigeration system, the desiccant wheel configured to be rotated within the air handling unit, the desiccant wheel comprising:
a first end and a second end; and
a metal organic framework ("MOF") desiccant disposed on a surface of the desiccant wheel, the rotation of the desiccant wheel configured to move a position of the surface between the first end and the second end, the MOF desiccant having a majority absorption-desorption operating band of 25% relative humidity or less.

13. The desiccant wheel of claim 12, wherein the MOF desiccant has an adsorption isotherm with an adsorption inflection point that occurs between 50% and 80% relative humidity.

14. The desiccant wheel of claim 12, wherein the MOF desiccant has a desorption isotherm with a desorption inflection point that occurs between 40% and 60% relative humidity.

15. The desiccant wheel of claim 12, wherein the MOF desiccant has a maximum uptake capacity, and uptake capacity of the MOF desiccant changes within the majority absorption-desorption operating band of the MOF desiccant by at least 50% of the maximum uptake capacity of the MOF desiccant.

16. The desiccant wheel of claim 12, wherein the MOF desiccant has an "S" shaped adsorption isotherm.

17. The desiccant wheel of claim 12, comprising:
a frame including the surface; and
a coating disposed on the surface of the frame, the coating including the MOF desiccant and a binder, and the coating containing 10 wt % or less of the binder.

* * * * *